United States Patent [19]

Gatto

[11] Patent Number: 4,704,840
[45] Date of Patent: Nov. 10, 1987

[54] MOLD AND METHOD OF USE

[76] Inventor: Paul J. Gatto, 1011 N. Northlake Dr., Hollywood, Fla. 33019

[21] Appl. No.: 831,573

[22] Filed: Feb. 21, 1986

[51] Int. Cl.$^4$ .......................... E04B 5/48; E04F 17/08; E04G 23/00
[52] U.S. Cl. ...................................... 52/741; 52/127.3; 52/221; 249/83; 249/97
[58] Field of Search ...................... 52/221, 127.3, 741; 285/192, 194, 419, 158, 189; 249/83, 90, 94, 95, 97, 173, 19

[56] References Cited

U.S. PATENT DOCUMENTS

| | | | |
|---|---|---|---|
| 713,537 | 11/1902 | Treadwell | 248/56 |
| 1,494,234 | 5/1924 | Gossett | 248/56 X |
| 3,167,292 | 1/1965 | Meyerowitz | 248/56 X |
| 3,726,050 | 4/1973 | Wise et al. | 52/1 |
| 4,096,350 | 6/1978 | Mayr et al. | 285/53 X |
| 4,363,199 | 12/1982 | Kucheria et al. | 52/221 |
| 4,445,304 | 5/1984 | Koda | 52/221 X |
| 4,575,133 | 3/1986 | Nattel | 285/192 X |

FOREIGN PATENT DOCUMENTS

| | | | |
|---|---|---|---|
| 1124099 | 5/1982 | Canada | 249/90 |
| 143460 | 8/1980 | German Democratic Rep. | 285/192 |
| 303406 | 8/1968 | Sweden | 248/56 |

Primary Examiner—John E. Murtagh
Attorney, Agent, or Firm—Malin, Haley & McHale

[57] ABSTRACT

A mold for retaining a sealing material within a passageway of a building partition. The mold consists of an annular ring member integrally coaxially connected to one end of a cylindrical sleeve member. The annular ring member is of greater transverse dimension than said sleeve member. Said mold may be constructed to appear as an inverted top hat. The cylindrical sleeve member may be provided with a longitudinal slit means for opening up said sleeve member and connecting it to a building tubular member such as a pipe to fit as a jacket thereon. In use the sleeve member is connected onto a building tubular member and may be fastened thereon, and the planar surface of said annular ring member is associated in facial planar relation with a building partition. Thereafter sealing material is placed in the area between said tubular member and said aperture wherein the planar surface of said annular ring member acts as a dam until setting of the sealant occurs.

1 Claim, 5 Drawing Figures

MOLD AND METHOD OF USE

BACKGROUND OF THE INVENTION

1. Field of the Invention

This invention relates to a novel element having utility in building structural installations. More specifically, it is designed for confining a flowable settable material in a space about a pipe or similar member passing through openings in floors, wherein the material upon setting forms a sealant in the space around a pipe or similar member.

2. Prior Art

The prior art teaches, as disclosed in U.S. Pat. No. 4,363,199 to Kucheria et al. which is herein incorporated by reference, that in the construction of residential and commercial buildings, pipes and other members, such as electrical cables and telephone cable trays, pass through walls and floors. The passageways for these members are necessarily somewhat larger than the members thereby resulting in a circumferential space between the member and the inner periphery of the passageway. It is well known to inject sealant material into the space for forming a fire retardant barrier for fire protection and/or waterproofing and vermin proofing.

SUMMARY OF THE INVENTION

It is an object of this invention to provide a mold constructed for engagement with a pipe or similar element passing through an opening in a building partition, whereby the mold functions to retain a flowable settable material in the space between the outer periphery of the pipe and the inner periphery of said opening.

It is a further object of this invention to provide a structural installation mold capable of permitting formation of a smooth surface at the bottom of an opening in a building partition to which a pipe or similar element passes therethrough.

It is still a further object of this invention to provide a mold so constructed for engaging a pipe or similar element and for permanent or temporary association with a pipe or similar element.

It is yet still another object of this invention to provide a structural installation mold capable of permitting an easy procedure of sealing about members passing through partitions.

Still other objects of this invention will be readily apparent to those skilled in the art in light of the following detailed description of the invention.

DETAILED DESCRIPTION OF THE INVENTION

Figure 1:
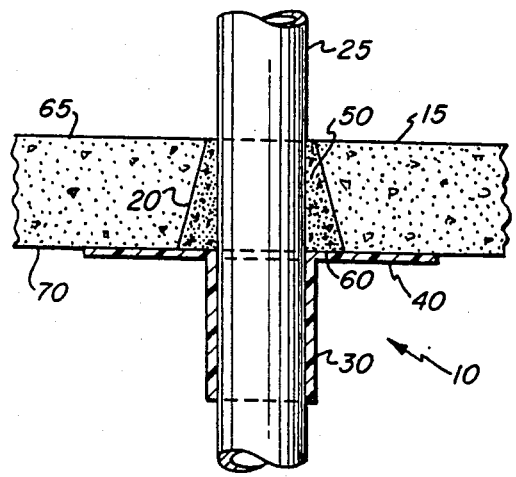
FIG. 1 is a cross section of the mold of the present invention in engagement with a pipe passing through a passageway in a concrete floor.
Figure 2:
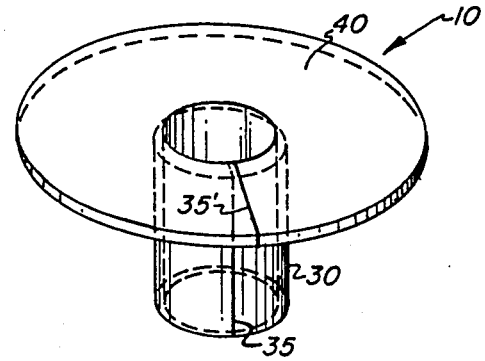
FIG. 2 is a perspective view of the mold of the invention.
Figure 3:
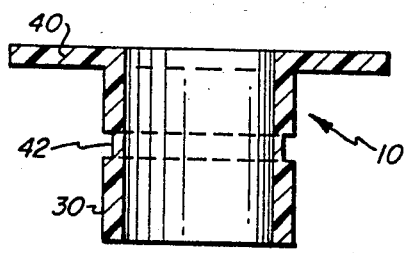
FIG. 3 is a cross-sectional view of the mold with means for accomodating a split fastening or similar fastening means.

Referring to the Figures of the drawing, FIGS. 1-3 illustrate a mold generally indicated by numeral 10 in association with a concrete floor 15 having a passage or opening 20 therethrough. A cast iron pipe 25 or similar member, such as electrical cable, electric cable trays and telephone cable trays 25, passes through opening or passageway 20.

Mold 10 can be fabricated of a fluorinated hydrocarbon, such as polytetrafluoroethylene or a self-extinguishing material, such as polyvinylchloride (PVC) or other functionally equivalent material as disclosed in U.S. Pat. No. 3,726,050. Mold 10 includes a tubular sleeve 30 split at 35 and including overlapping parts at 32, 34 and an annular disk shaped element or flange 40 of greater transverse dimension than sleeve 30 with split 35'. Element 40 is functionally integral with the split sleeve. The annular disk 40 is of such dimension to completely enclose the bottom 60 of the passageway 20. The sleeve may be round, square or other shapes in cross-section in order to accommodate channels or pipes of various cross-sections.

The split sleeve of the mold is either formed of material of sufficient resiliency for frictionally gripping a cast iron pipe member 25 or a non-resilient material which includes a circumferential recess 42, as shown in FIG. 3, for receiving a clamp (not shown), such as a hot water hose clamp, for securing the mold to a pipe member 25. Where the pipe member 25 is of plastic, the mold may be secured thereto by an epoxy resin or other adhesive material.

Figure 4:
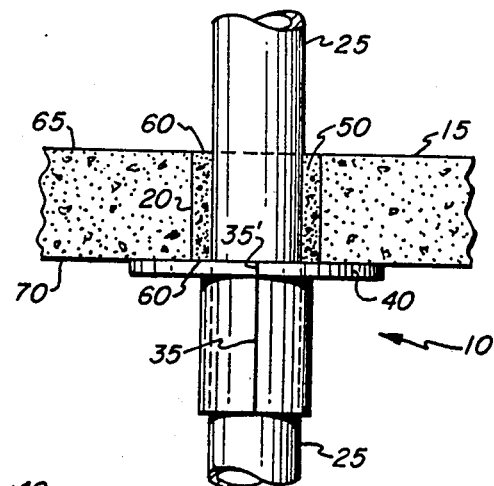
FIG. 4 is a view similar to FIG. 1, but showing a different configuration of a concrete floor.
Figure 5:
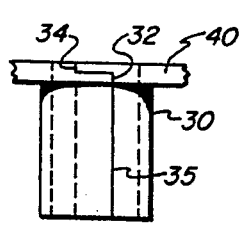
FIG. 5 is a partial side view showing overlapped edges.

The passageway 20 in a concrete floor may be of an inverted funnel shape as illustrated in FIG. 1 or cylindrically shaped as in FIG. 4.

After opening the mold a split 35 and 35' and securing mold 10 around the pipe 25 and closing off the bottom 60 of passageway 20, the passageway 20 is filled with any conventional sealant material 50 as disclosed in the patent to Kucharia to form exterior surfaces co-planar with the exterior surfaces 65 of the concrete floor.

The mold is preferably removed after curing or setting of the sealant material. However, the mold may be left on the completed structure of the building to form part of the seal and it need not be removed.

It is evident from the above disclosure that other modifications may be made within the scope thereof without departing from the spirit of the invention or sacrificing the principal advantages herein.

What is claimed is:

1. A process of filling a space about a tubular member in a passageway of a structural building partition utilizing a molded sleeve having an outer facing surface and an inner facing surface and further having a longitudinal slit, said slit having opposed edges for mating contact with each other, said opposed edges having complementary longitudinal recesses disposed therein respectively thereby causing the respective inner and outer facing surfaces to be continuous when said sleeve is positioned about a tubular member, with an integrally formed annular flange member having a planar top surface connected to one end of said sleeve, comprising the steps of:

positioning the sleeve about said tubular member;
positioning the top surface of said annular flange member in interfacial contact with one surface of said partition whereby said annular flange member provides a bottom surface for said passageway;
securing said sleeve to said tubular member by closing said slit together for preventing movement thereof during filling of said space with a sealant material;
filling said space with a sealant material; and
permitting said sealant to solidify;
removing said sleeve after solidification of said sealant material whereby top and bottom surfaces of said sealant are co-extensive with top and bottom surfaces, respectively, of said partition, said space being shaped as an inverted funnel.

* * * * *